(12) United States Patent
Wakita

(10) Patent No.: US 9,920,285 B2
(45) Date of Patent: Mar. 20, 2018

(54) THERMOPLASTIC RESIN COMPOSITION FOR CLEANING MOLDING PROCESSING MACHINE

(71) Applicant: DAICEL POLYMER LTD., Minato-ku, Tokyo (JP)

(72) Inventor: Naoki Wakita, Himeji (JP)

(73) Assignee: DAICEL POLYMER LTD., Minato-ky, Tokyo (JP)

( * ) Notice: Subject to any disclaimer, the term of this patent is extended or adjusted under 35 U.S.C. 154(b) by 746 days.

(21) Appl. No.: 14/373,244

(22) PCT Filed: Jan. 15, 2013

(86) PCT No.: PCT/JP2013/050510
§ 371 (c)(1),
(2) Date: Jul. 18, 2014

(87) PCT Pub. No.: WO2013/111632
PCT Pub. Date: Aug. 1, 2013

(65) Prior Publication Data
US 2015/0021802 A1    Jan. 22, 2015

(30) Foreign Application Priority Data

Jan. 27, 2012  (JP) ................................ 2012-014737

(51) Int. Cl.
| | |
|---|---|
| *C11D 3/37* | (2006.01) |
| *B29C 33/72* | (2006.01) |
| *C08L 23/02* | (2006.01) |
| *C11D 10/04* | (2006.01) |
| *C11D 11/00* | (2006.01) |
| *C08L 23/06* | (2006.01) |
| *C08L 23/08* | (2006.01) |
| *C08L 23/10* | (2006.01) |
| *B08B 7/00* | (2006.01) |
| *C11D 3/20* | (2006.01) |
| *C11D 3/36* | (2006.01) |
| *C08L 23/04* | (2006.01) |
| *C08K 5/098* | (2006.01) |
| *C08K 5/103* | (2006.01) |
| *C08K 5/521* | (2006.01) |
| *C11D 1/34* | (2006.01) |
| *C11D 1/66* | (2006.01) |
| *C08K 5/1535* | (2006.01) |
| *C08L 33/12* | (2006.01) |

(52) U.S. Cl.
CPC .............. *C11D 3/3749* (2013.01); *B08B 7/00* (2013.01); *B29C 33/72* (2013.01); *C08L 23/02* (2013.01); *C08L 23/04* (2013.01); *C08L 23/06* (2013.01); *C08L 23/0807* (2013.01); *C08L 23/0815* (2013.01); *C08L 23/10* (2013.01); *C11D 1/66* (2013.01); *C11D 3/2075* (2013.01); *C11D 3/362* (2013.01); *C11D 3/3761* (2013.01); *C11D 10/04* (2013.01); *C11D 11/0041* (2013.01); *C08K 5/098* (2013.01); *C08K 5/103* (2013.01); *C08K 5/1535* (2013.01); *C08K 5/521* (2013.01); *C08L 33/12* (2013.01); *C08L 2207/062* (2013.01); *C08L 2207/066* (2013.01); *C11D 1/345* (2013.01); *C11D 1/667* (2013.01)

(58) Field of Classification Search
CPC ..................................................... C11D 3/3749
See application file for complete search history.

(56) References Cited

U.S. PATENT DOCUMENTS

| | | | |
|---|---|---|---|
| 5,238,608 | A | 8/1993 | Obama et al. |
| 6,001,188 | A | 12/1999 | Walsh et al. |
| 7,531,490 | B2 | 5/2009 | Kondo et al. |
| 2006/0079437 | A1 | 4/2006 | Kondo et al. |

FOREIGN PATENT DOCUMENTS

| | | |
|---|---|---|
| CN | 1166523 A | 12/1997 |
| CN | 1754953 A | 4/2006 |
| DE | 103 34 293 A1 | 3/2005 |
| EP | 0 972 807 A1 | 1/2000 |
| EP | 2 471 898 A1 | 7/2012 |
| JP | 08-027335 A | 1/1996 |
| JP | 10-279816 A | 10/1998 |
| JP | 2002-001734 A | 1/2002 |
| JP | 2006-257297 A | 9/2006 |
| JP | 2007-021765 A | 2/2007 |
| JP | 2009-249559 A | 10/2009 |

(Continued)

OTHER PUBLICATIONS

Office Action of Chinese Patent Office issued in Application No. 201380004140.X, dated Jan. 4, 2016 (5 pages).

(Continued)

*Primary Examiner* — Larry Thrower
(74) *Attorney, Agent, or Firm* — Flynn, Thiel, Boutell & Tanis, P.C.

(57) ABSTRACT

A thermoplastic resin composition for cleaning a molding processing machine, which has good cleaning performance and workability in cleaning an inner side of a molding processing machine of thermoplastic resin composition, such as an extruder and an injection molding and includes (A) an olefin-based resin, (B) a thermoplastic resin which is not compatible with the olefin-based resin of the component (A), (C) a thermoplastic resin for making the olefin-based resin of the component (A) and the thermoplastic resin of the component (B) compatible with each other, (D) an alkaline metal salt of a fatty acid, (E) a nonionic surfactant, and (F) a metal salt of an acidic phosphoric ester.

8 Claims, No Drawings

(56) References Cited

FOREIGN PATENT DOCUMENTS

| JP | 2010-095624 A | 4/2010 |
| JP | 2010-095625 A | 4/2010 |
| JP | 2010-189515 A | 9/2010 |
| JP | 2011-046808 A | 3/2011 |
| WO | WO 2010/044254 A1 | 4/2010 |
| WO | WO 2011/024828 A1 | 3/2011 |
| WO | WO 2012/090620 A1 | 7/2012 |

OTHER PUBLICATIONS

Form PCT/IB/373 English translation of International Preliminary Report on Patentability issued in International Application No. PCT/JP2013/050510 dated Jul. 29, 2014 (1 page).
Form PCT/ISA/237 English translation of Written Opinion of the International Searching Authority issued in International Application No. PCT/JP2013/050510 dated Apr. 23, 2013 (5 pages).
International Search Report for PCT/JP2013/050510 (2 pgs.).
EPO Search Report dated Aug. 20, 2015 (4 pages).

THERMOPLASTIC RESIN COMPOSITION FOR CLEANING MOLDING PROCESSING MACHINE

TECHNICAL FIELD

The present invention relates to a thermoplastic resin composition for cleaning a molding processing machine, which cleans a molding processing machine such as an extruder or an injection molding machine.

BACKGROUND ART

As a cleaning agent for cleaning a molding processing machine of a thermoplastic resin composition, there is known one obtained by combining a base resin and other components.

In JP-A 2010-95624, JP-A 2010-95625, JP-A 2011-46808, JP-A 10-279816, and JP-A 2007-21765, there are disclosed cleaning compositions in which a base resin and an anionic surfactant are combined.

SUMMARY OF THE INVENTION

The problem to be solved by the present invention is to provide a thermoplastic resin composition for cleaning a molding processing machine, in which the cleaning performance is further enhanced by combining a base resin and a surfactant.

The present invention has been completed by finding that cleaning performance is further enhanced and that workability is also enhanced by, when combining a base resin and a surfactant, combining a nonionic surfactant and further combining a metal salt of an acidic phosphoric ester.

According to the present invention, there is provided a thermoplastic resin composition for cleaning a molding processing machine, which contains:
(A) an olefin-based resin,
(B) a thermoplastic resin which is not compatible with the olefin-based resin of the component (A),
(C) a thermoplastic resin for making the olefin-based resin of the component (A) and the thermoplastic resin of the component (B) compatible with each other,
(D) an alkaline metal salt of a fatty acid,
(E) a nonionic surfactant, and
(F) a metal salt of an acidic phosphoric ester.

The present invention can provide an application in which the aforementioned thermoplastic resin composition is used for cleaning a molding processing machine.

DETAILED DESCRIPTION OF THE INVENTION

According to the thermoplastic resin composition for the cleaning of the present invention, there are obtained a good cleaning performance and workability in cleaning an inner side of a molding processing machine of a thermoplastic resin composition, such as an extruder or an injection molding machine.

<Component (A)>

The component (A) is an olefin-based resin.

A preferable olefin-based resin of the component (A) is one or more kinds selected from HDPE, LDPE, LLDPE and a polypropylene homopolymer, a copolymer of ethylene and propylene, a copolymer of ethylene and/or propylene and a copolymerizable monomer thereof, and the like.

<Component (B)>

The component (B) is a thermoplastic resin which is not compatible with the olefin-based resin of the component (A).

A preferable thermoplastic resin of the component (B) is one or more kinds selected from AS resin, MS resin, a copolymer of methyl methacrylate-maleic anhydride-styrene, and PMMA resin.

<Component (C)>

The component (C) is a thermoplastic resin for making the olefin-based resin of the component (A) and the thermoplastic resin of the component (B) compatible with each other.

A preferable thermoplastic resin of the component (C) is one or more kinds selected from EEA, EMA, EMMA, and EBA.

With respect to content ratios of the components (A) to (C) in the composition;
the content ratio of the component (A) is preferably 30 to 90% by mass, more preferably 40 to 80% by mass,
the content ratio of the component (B) is preferably 8 to 60% by mass, more preferably 15 to 50% by mass,
the content ratio of the component (C) is 2 to 20% by mass, more preferably 5 to 15% by mass.

<Component (D)>

The alkaline metal salt of a fatty acid (D) is preferably a Na, K, Li, Cs salt of a saturated or unsaturated fatty acid having 10 to 22 carbon atoms. The fatty acid may have a straight chain or a branched chain.

Among them, more preferable is a Na salt of a fatty acid having 12 to 18 carbon atoms (lauric acid, myristic acid, palmitic acid, stearic acid, oleic acid).

The content ratio of the alkaline metal salt of a fatty acid of the component (D) in the composition is 0.5 to 10 parts by mass relative to 100 parts by mass of the total amount of the components (A) to (C), preferably 1 to 10 parts by mass, and more preferably 1 to 6 parts by mass.

<Component (E)>

Examples of the nonionic surfactant of the component (E) include one selected from an oxyethylene chain-type surfactant, a sorbitan ester-type surfactant, a glyceride-based (glycerine (mono, di) fatty acid esters) surfactant, a 12-hydroxystearic acid ester, a propylene glycol fatty acid ester, a sucrose fatty acid ester, an alkyl glyceryl ether, an alkyl glucoside, and the like.

Among them, preferable are one or more kinds selected from a sorbitan ester-type surfactant, a glyceride-based surfactant, a 12-hydroxystearic acid ester.

The content ratio of the nonionic surfactant of the component (E) in the composition is 0.5 to 10 parts by mass relative to 100 parts by mass of the total amount of the components (A) to (C), preferably 1 to 10 parts by mass, and more preferably 1 to 6 parts by mass.

The content ratio of the component (D) in the total mass of the components (D) and the component (E) is preferably 30 to 70% by mass, more preferably 40 to 60% by mass, and the content ratio of the component (E) corresponds to a residual proportion.

<Component (F)>

The component (F) is a metal salt of an acidic phosphoric ester. The component (F) is a component which acts, when using the component (D) and the component (E) together, so as to prevent generation of a gas (gas that contains a fatty acid and the like) produced by decomposing the component (E) due to the action of the alkaline metal contained in the component (D).

As the component (F), there can be used, for example, a salt of an acidic phosphoric ester represented by the general formula (I) or (II) described from the paragraph 0021 to the paragraph 0032 of JP 2010-189515 A.

The preferable component (F) is magnesium stearyl acid phosphate, calcium stearyl acid phosphate, zinc stearyl acid phosphate, aluminum stearyl acid phosphate, and the like.

As the component (F), there can be used commercially available products, and there can be used, for example, zinc stearyl acid phosphate (LBT1830 manufactured by SAKAI Chemical Industry Co., Ltd.), aluminum stearyl acid phosphate (LBT1813 manufactured by SAKAI Chemical Industry Co., Ltd.), calcium stearyl acid phosphate (LBT1820 manufactured by SAKAI Chemical Industry Co., Ltd.), magnesium stearyl acid phosphate (LBT-1812), and the like.

The content ratio of the component (F) in the composition is preferably 10 to 100 parts by mass relative to 100 parts by mass of the total amount of the component (D) and the component (E), more preferably 10 to 80 parts by mass.

<Other Components>

The composition of the present invention can further contain an inorganic filler. Examples of the inorganic filler other than a well-known glass fiber and a metal fiber can include one selected from molten slag, steel slag or crushed materials thereof, artificial mineral fibers which are described in JP 2006-257297 A, and can be used in a fibrous or non-fibrous form (powder, granules, crushed materials, and the like).

The composition of the present invention can further include an alkylene glycol fatty acid ester, an organic phosphorous compound, a polyalcohol, and a metal soap described in JP 2006-257297 A.

The composition of the present invention is manufactured by, after pre-mixing the aforementioned components with a mixer such as Henschel mixer, a tumbler blender or a kneader, kneading the resultant components with an extruder, or melt-kneading the components with heated rolls, and a Banbury mixer.

EXAMPLES

Examples and Comparative Examples

The respective components having the compositions shown in Table 1 were mixed with a tumbler blender, and then melt-kneaded with an extruder to give pelletized resin compositions. By using these compositions, the cleaning test was conducted according to the following method. The results are shown in Table 1.

As a precedent resin to be used, 1 kg of a red colored product of HDPE (concentration of red color 0.5%) was injection-molded with an injection molding machine ("SH100" manufactured by Sumitomo Heavy Industries, Ltd.; Cylinder temperature 230° C.).

After that, by using the composition of Table 1, procedures of weighting and injection were repeated, cleaning was terminated at the moment when the red color disappeared, and a cleaning ability was evaluated by the amount used (kg) of the component until then.

Furthermore, after the termination of cleaning, a cleaning ability (the presence or absence of the preceding material) was evaluated from the viewpoint of whether or not the red color of the precedent resin (preceding material HDPE) could be observed when flowing an AS resin (Cevian N 050SF manufactured by Daicel Polymer LTD.).

TABLE 1

| | | Examples | | | Comparative Examples | | | | | |
|---|---|---|---|---|---|---|---|---|---|---|
| | | 1 | 2 | 3 | 1 | 2 | 3 | 4 | 5 | 6 |
| (A) | LLDPE | 55 | 60 | | 100 | | 55 | 55 | 55 | 60 |
| | HDPE | | | 70 | | 100 | | | | 30 |
| (B) | PMMA | | 30 | | | | | | | |
| | MS | 40 | | 20 | | | 40 | 40 | 40 | |
| (C) | EMA | 5 | 10 | | | | 5 | 5 | 5 | |
| | EBA | | | 10 | | | | | | 10 |
| (D) | Stearic acid Na | 3 | 3 | 3 | 3 | 3 | 3 | | 3 | |
| (E) | Nonionic surfactant 1 | 3 | | 2 | 3 | 3 | | 3 | 3 | |
| | Nonionic surfactant 2 | | 2 | | | | | | | |
| (F) | Salt of acidic phosphoric ester | 1 | 3 | 2 | 1 | 2 | 1 | 1 | | 2 |
| | Amount used (kg) of component | 0.5 | 1.0 | 1.0 | 2 | 2 | 2 | 2 | 1 | 1.5 |
| | Presence or absence of preceding material remaining | Not observed | Not observed | Not observed | Observed | Observed | Observed | Observed | Not observed | Observed |
| | Generation of gas | Not observed | Not observed | Not observed | Not observed | Not observed | Not observed | Not observed | Observed | Not observed |

Component (A)
LLDPE: Nipolon-L T240F of Tosoh Corporation
HDPE: Hipolon Hard 6000 of Tosoh Corporation
Component (B)
PMMA: ACRYPET MF of Mitsubishi Rayon Co., Ltd.
MS: Cevian MAS30 of Daicel Polymer LTD.
Component (C)
EMA: Elvaloy AC 1820 of Du Pont Mitsui Polychemicals Co., Ltd.
EBA: LOTRYL 30BA02 of Arkema K.K.
Component (D)
Na stearate
Component (E)
Nonionic surfactant 1: Diglycerin stearate
Nonionic surfactant 2: Sorbitan stearate
Component (F)
Salt of acidic phosphoric ester: Zinc stearyl acid phosphate (LBT-1830 manufactured by SAKAI Chemical Industry Co., Ltd.)

The invention claimed is:

1. A thermoplastic resin composition for cleaning a molding processing machine, comprising:
   (A) an olefin-based resin,
   (B) a thermoplastic resin which is not compatible with the olefin-based resin of component (A),
   (C) a thermoplastic resin for making the olefin-based resin of component (A) and the thermoplastic resin of component (B) compatible with each other,
   (D) an alkaline metal salt of a fatty acid,
   (E) a nonionic surfactant, and
   (F) a metal salt of an acidic phosphoric ester.

2. The thermoplastic resin composition for cleaning a molding processing machine according to claim 1,
   wherein, in the total mass of component (D) and component (E), a content ratio of component (D) is 30 to 70% by mass, and a content ratio of component (E) is 70 to 30% by mass, and
   wherein a content ratio of component (F) is 10 to 100 parts by mass relative to 100 parts by mass of the total amount of component (D) and component (E).

3. The thermoplastic resin composition for cleaning a molding processing machine according to claim 1,
   wherein the salt of an acidic phosphoric ester of component (F) is one selected from magnesium stearyl acid phosphate, calcium stearyl acid phosphate, zinc stearyl acid phosphate, and aluminum stearyl acid phosphate.

4. The thermoplastic resin composition for cleaning a molding processing machine according to claim 1,
   wherein the nonionic surfactant of component (E) is one or more kinds selected from a sorbitan ester-type surfactant and a glyceride-based surfactant.

5. The thermoplastic resin composition for cleaning a molding processing machine according to claim 1,
   wherein the thermoplastic resin of component (B) is one or more kinds selected from AS resin, MS resin, a copolymer of methyl methacrylate-maleic anhydride-styrene and PMMA resin.

6. The thermoplastic resin composition for cleaning a molding processing machine according to claim 1,
   wherein the thermoplastic resin of component (C) is one or more kinds selected from EEA, EMA, EMMA, and EBA.

7. The thermoplastic resin composition for cleaning a molding processing machine according to claim 1,
   wherein the olefin-based resin of component (A) is one or more kinds selected from HDPE, LDPE, LLDPE and a polypropylene homopolymer.

8. The thermoplastic resin composition for cleaning a molding processing machine according to claim 1, wherein the alkaline metal salt of a fatty acid of component (D) is a Na, K, Li or Cs salt of a saturated or unsaturated fatty acid having 10-22 carbon atoms.

\* \* \* \* \*